United States Patent
Minnich et al.

(10) Patent No.: US 7,909,098 B2
(45) Date of Patent: *Mar. 22, 2011

(54) PROCESS FOR RECOVERING HEAVY OIL UTILIZING ONE OR MORE MEMBRANES

(75) Inventors: Keith R Minnich, Pewaukee, WI (US); Kashi Banerjee, Moon Township, PA (US)

(73) Assignee: HPD, LLC, Plainfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/488,118

(22) Filed: Jun. 19, 2009

(65) Prior Publication Data

US 2009/0255673 A1    Oct. 15, 2009

Related U.S. Application Data

(63) Continuation of application No. 12/199,283, filed on Aug. 27, 2008, now Pat. No. 7,597,144.

(60) Provisional application No. 60/968,182, filed on Aug. 27, 2007.

(51) Int. Cl.
*E21B 43/40* (2006.01)
*E21B 43/24* (2006.01)

(52) U.S. Cl. ............ 166/266; 166/267; 166/272.3; 166/371

(58) Field of Classification Search ............ None
See application file for complete search history.

(56) References Cited

U.S. PATENT DOCUMENTS
2008/0110630 A1    5/2008  Minnich et al.

OTHER PUBLICATIONS

Kok, Sandra and Edward Doyle, Chapter 5 Removal of Total Dissolved Solids, Produced Water Treatment Design Manual, Wastewater Technology Centre, pp. 1-23.
Koren, A. and N. Nadav, Mechanical Vapour Compression to Treat Oil Field Produced Water, Desalination, 1994, pp. 41-48, vol. 98, Elsevier Science Publishers B.V., Netherlands.
Kok, Sandra and A. Zaidi, Total Dissolved Solids Removal From Water Produced During the In Situ Recovery of Heavy Oil and Bitumen, The 37th Annual Technical Meeting of the Petroleum Society of CIM, Jun. 8-11, 1986, pp. 366-373, Calgary, Canada.
Zaidi, S.A. and S. Kok and J.W. Schmidt, The Use of Vapour Compression Evaporation for Removing Total Dissolved Solids From Produced Water, The Heavy Oil and Oil Sands Technical Symposium—Challenges and Innovations, Mar. 16, 1988, pp. 1-23, Calgary, Canada.

*Primary Examiner* — Zakiya W. Bates
(74) *Attorney, Agent, or Firm* — Coats & Bennett, P.L.L.C.

(57) ABSTRACT

An oil recovery process utilizes one or more membranes to remove silica and/or oil from produced water. In one method, the process includes separating oil from produced water and precipitating silica. The produced water having the precipitated silica is directed to a membrane, such as a ceramic membrane, which removes the precipitated silica from the produced water. In some cases, residual oil is present and is also removed by the membrane.

25 Claims, 7 Drawing Sheets

PROCESS FOR RECOVERING HEAVY OIL UTILIZING ONE OR MORE MEMBRANES

CROSS-REFERENCE TO RELATED APPLICATION

The present application is a continuation of U.S. patent application Ser. No. 12/199,283 filed Aug. 27, 2008, the disclosure of which is hereby expressly incorporated by reference.

FIELD OF THE INVENTION

The present invention relates to a process for recovering heavy oil, more particularly, to an oil recovery process that utilizes a membrane process to remove silica and residual oil from produced water upstream of water treatment and steam generation processes.

BACKGROUND

Conventional oil recovery involves drilling a well and pumping a mixture of oil and water from the well. Oil is separated from the water, and the water is usually injected into a sub-surface formation. Conventional recovery works well for low viscosity oil. However, conventional oil recovery processes do not work well for higher viscosity, or heavy oil.

Enhanced Oil Recovery (EOR) processes employ thermal methods to improve the recovery of heavy oils from subsurface reservoirs. The injection of steam into heavy oil bearing formations is a widely practiced EOR method. Typically, several tons of steam are required for each ton of oil recovered. Steam heats the oil in the reservoir, which reduces the viscosity of the oil and allows the oil to flow to a collection well. Steam condenses and mixes with the oil, to form an oil-water mixture. The mixture of oil and water is pumped to the surface. Oil is separated from the water by conventional processes employed in conventional oil recovery operations to form produced water.

For economic and environmental reasons it is desirable to recycle the produced water. This is accomplished by treating the produced water, producing a feedwater, and directing the treated feedwater to a steam generator or boiler and producing steam. The complete water cycle includes the steps of:
injecting the steam into an oil bearing formation,
condensing the steam to heat the oil whereupon the condensed steam mixes with the oil to form an oil-water mixture,
collecting the oil-water mixture in a well,
pumping the oil-water mixture to the surface,
separating the oil from the oil-water mixture to form produced water,
treating the produced water to form feedwater for steam generation equipment, and
converting the feedwater into steam having a quality of approximately 70% to 100% for injecting into the oil bearing formation.

Steam generation equipment can take various forms that generally include either once through steam generators (OTSG) or boilers of various types. However, treating the produced water to form a relatively pure feedwater for steam generation is challenging. In particular, treating the produced water to retard or prevent silica scaling in purification equipment, such as evaporators, and in steam generation equipment is difficult.

Various approaches have addressed silica scaling. It is known that chemically treating water to precipitate silica will reduce the silica concentration to a level that is suitable for use in producing steam using Once Through Steam Generators (OTSG). This process is generally referred to as Warm Lime Softening followed by Ion Exchange. Silica precipitates as very fine crystals that are usually only several microns in size. These fine silica crystals are difficult to economically remove by conventional mechanical separation devices such as deep bed filters, centrifuges, hydrocyclones, and gravity settlers. Another method is to trap the silica precipitates in a magnesium hydroxide and/or calcium carbonate sludge that is created by addition of lime, magnesium oxide, and soda ash. This process has the disadvantage, however, of requiring large quantities of chemicals and producing large quantities of waste sludge. When used in this method, gravity settlers are sensitive to variations in feed chemistry and are easily upset, creating problems for downstream equipment.

It is also known to chemically treat the produced water and subject chemically-treated produced water to an evaporation process that produces a distillate which becomes feedwater to an OTSG or boiler. In particular, it is known to use an evaporator and mechanical vapor compressor to produce the distillate. In this particular approach, the pH of the produced water fed to the evaporator is raised to maintain the solubility of silica. This prevents silica based scales from fouling the evaporator heat transfer surfaces. However, there are drawbacks and disadvantages to this approach as well. The addition of caustic to raise the pH represents a significant operating cost. Mechanical vapor compression evaporators recover typically approximately 95% of the water from the de-oiled produced water. The remaining 5% yields a concentrate stream that is difficult to process. The pH is usually higher than 12, which makes the concentrate stream extremely hazardous. Any attempt to neutralize the stream causes the precipitation of silica solids which are very difficult to separate from the aqueous solution. The neutralization process is also known to release hazardous gases, such as hydrogen sulfide. These systems consequently tend to be expensive to operate and costly to maintain.

SUMMARY OF THE INVENTION

The present invention relates to an oil recovery process that utilizes one or more membranes to remove silica and/or oil from produced water. In one embodiment, the process includes separating oil from the produced water and precipitating silica onto crystals. The produced water having the precipitated silica is directed to a membrane, such as a ceramic membrane, which removes the precipitated silica from the produced water. In some cases residual oil is present and may be removed by the membrane.

In one particular embodiment, the produced water is directed to a membrane which produces permeate that in turn is directed to an evaporator. The evaporator produces distillate that forms boiler feedwater, which in turn is directed to a boiler which produces steam for injection into an oil bearing formation.

Another embodiment of the invention includes a reverse osmosis unit interposed between the membrane and an evaporator. The reverse osmosis unit produces a high quality permeate from the membrane permeate, forming boiler feedwater. Reject from the reverse osmosis system becomes the feed to the evaporator. The evaporator produces a distillate forming boiler feedwater. Permeate from the reverse osmosis unit is supplied to the boiler, and the reject stream from the reverse osmosis unit is evaporated to produce a distillate also supplied to the boiler.

The invention also entails an embodiment including a ceramic membrane unit used in conjunction with a once through steam generator to generate steam from produced water. An ion exchange unit receives ceramic membrane permeate and the effluent from the ion exchange becomes the feedwater to the once through steam generator. Steam from the once through steam generator is de-misted to provide high quality steam for injection.

The invention includes in one embodiment the use of an evaporation process. Concentrate from the evaporator, which has a pH of approximately 10.5 or higher, is neutralized with acid to a pH of approximately 9 or lower. The neutralization process will cause the precipitation of silica. The neutralized concentrate becomes the feed to a ceramic membrane process to further remove silica and to remove residual oil from the evaporator concentrate, which renders the concentrate easier to handle for ultimate disposition. In this embodiment, the ceramic membrane permeate may be directed to a second evaporator and/or a reverse osmosis unit for further purification prior to being directed to a boiler.

The Other objects and advantages of the present invention will become apparent and obvious from a study of the following description and the accompanying drawings which are merely illustrative of such invention.

METHOD OF REMOVING HEAVY OIL

Figure 1:
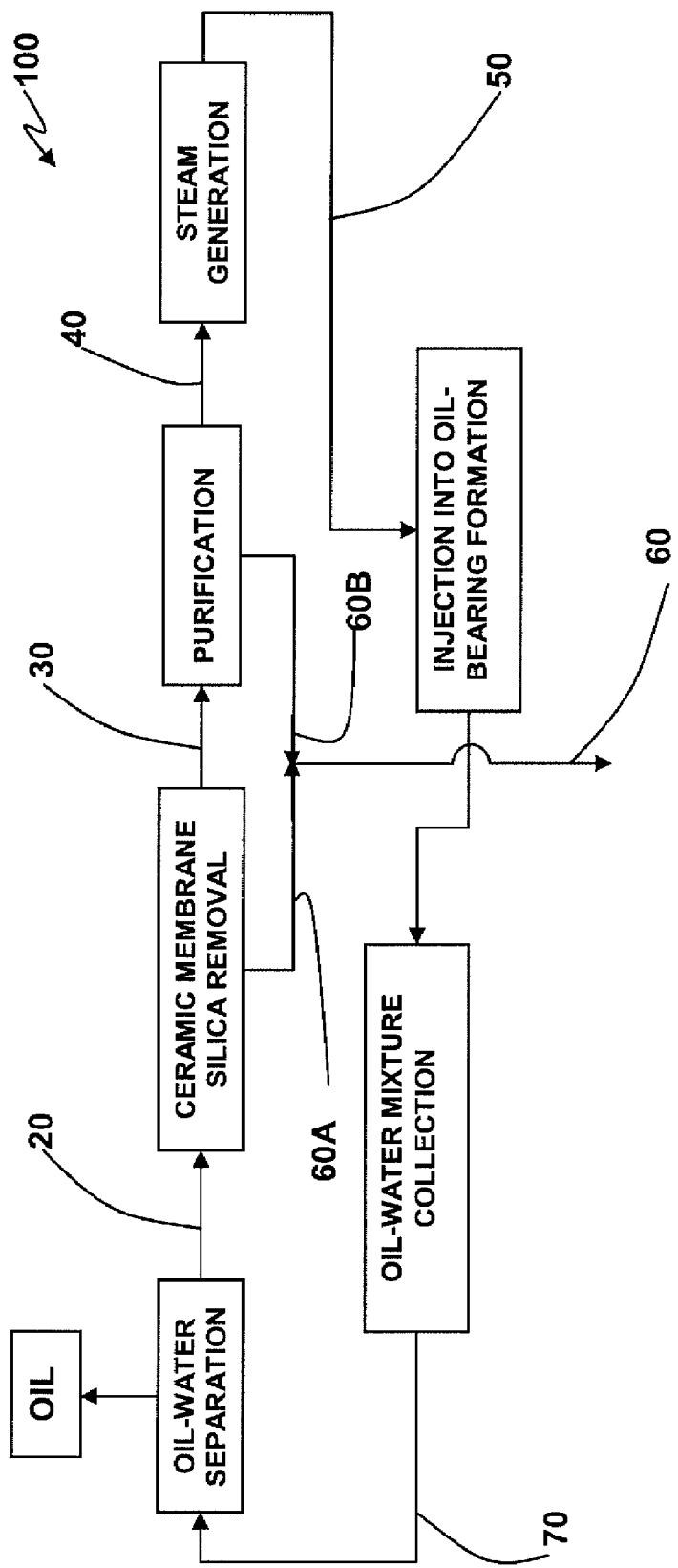
FIG. 1 is a schematic illustrating basic process steps for recovering heavy oil.

The present invention entails a process for use in heavy oil recovery for cleaning produced water for steam generation. Heavy oil recovery is generally accomplished by injecting steam into heavy-oil bearing underground formations. Steam heats the oil, thereby condensing. The resulting oil-water mixture is pumped to the surface where the oil is separated from the mixture leaving what is called produced water. The produced water is re-used to generate steam to feed back into the oil-bearing formation.

Produced water includes dissolved organic ions, dissolved organic acids and other dissolved organic compounds, suspended inorganic and organic solids, and dissolved gases. Typically, the total suspended solids in the produced water is less than about 1000 ppm. In addition to suspended solids, produced water from heavy oil recovery processes includes dissolved organic and inorganic solids in varying portions. Dissolved and suspended solids, in particular silica-based compounds, in the produced water have the potential to foul purification and steam generation equipment by scaling. Additional treatment is therefore desirable after oil-water separation to remove suspended silica-based compounds from the produced water. Hereinafter, the term "silica" will be used to refer generally to silica-based compounds.

In order to prevent silica scaling and/or fouling of purification and steam generation equipment, the present invention provides that produced water be treated by using a ceramic membrane process to substantially remove silica from the produced water. The produced water, having silica removed, is further purified by any of a variety of purification processes including reverse osmosis, evaporation, and ion exchange treatment before being directed to steam generation equipment. Steam generation equipment may include at least boilers and once through steam generators.

Discussed herein are processes that utilize membranes, particularly ceramic membranes in oil recovery processes. A range of contaminants can be removed from a waste stream with one or more membranes. In an oil recovery process, for example, silica and residual oil in the produced water are contaminants that may be effectively removed with membranes, particular ceramic membranes. In order to prevent silica scaling in purification and steam generation equipment, the processes disclosed herein provide that produced water is treated by using a ceramic membrane process to substantially remove silica from produced water or from other streams, such as a concentrate brine stream, that may be produced in the process of treating a produced water stream. In the case of produced water, after silica is removed, the produced water or other resulting stream can be purified by any of a variety of purification processes including reverse osmosis, evaporation, ion exchange of treatment, after which the treated stream can be directed to steam generation equipment. Steam generation equipment may include boilers, once through steam generators, etc.

The general process of the present invention is illustrated schematically in FIG. 1, the schematic diagram denoted by the numeral 100. Oil-water mixture 70 is directed to an oil-water separation process which effectively separates the oil from the water. This is commonly referred to as primary separation and can be carried out by various conventional processes such as gravity or centrifugal separation. Separated water is subjected, in some cases, to a polishing de-oiling process where additional oil is removed from the water. Resulting water from the oil-water separation process is referred to as produced water. Produced water contains residual suspended silica solids, emulsified oil, and dissolved solids. Produced water is directed via line 20 to a ceramic membrane for silica removal. It should be pointed out that silica and residual oil can be removed simultaneously, or in stages with multiple ceramic membranes. The ceramic membrane generates a permeate stream 30 and a reject stream 60A. The permeate from the ceramic membrane is directed to a downstream purification process, such as an evaporation process. Reject stream 60A from the ceramic membrane is directed to a waste line 60. The downstream purification process purifies the permeate and produces a purified water stream 40 and a reject or waste stream 60B. Purified water is directed to a steam generation process and the reject stream from the purification process is directed to a waste line 60. Steam is generated by the steam generation process and injected into the oil bearing formation to form the oil-water mixture that is collected and pumped to the surface where oil is separated therefrom.

Figure 2:
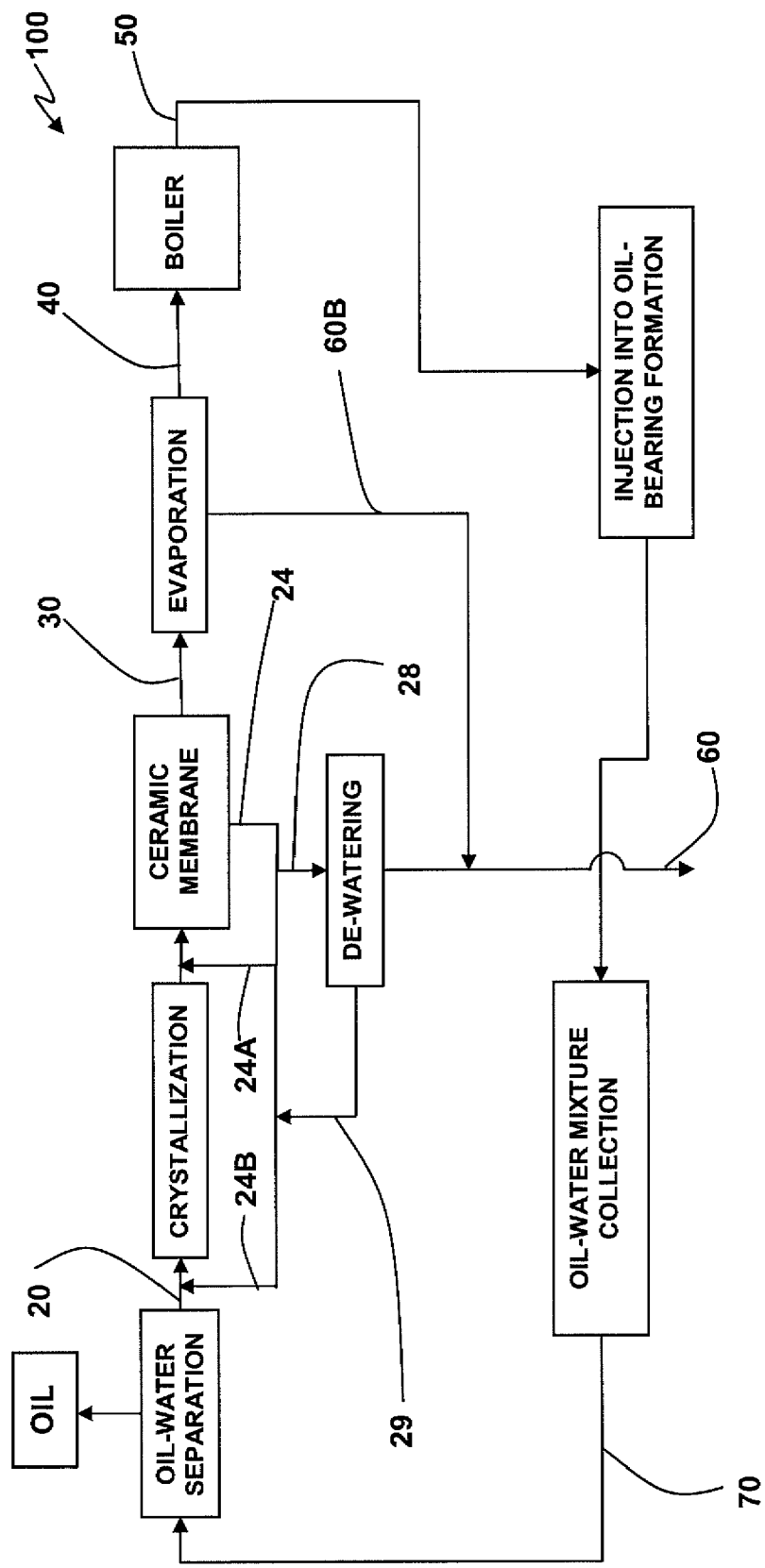
FIG. 2 is a schematic drawing showing a heavy oil recovery process utilizing a ceramic membrane to remove silica from produced water prior to an evaporation process.
Figure 3:
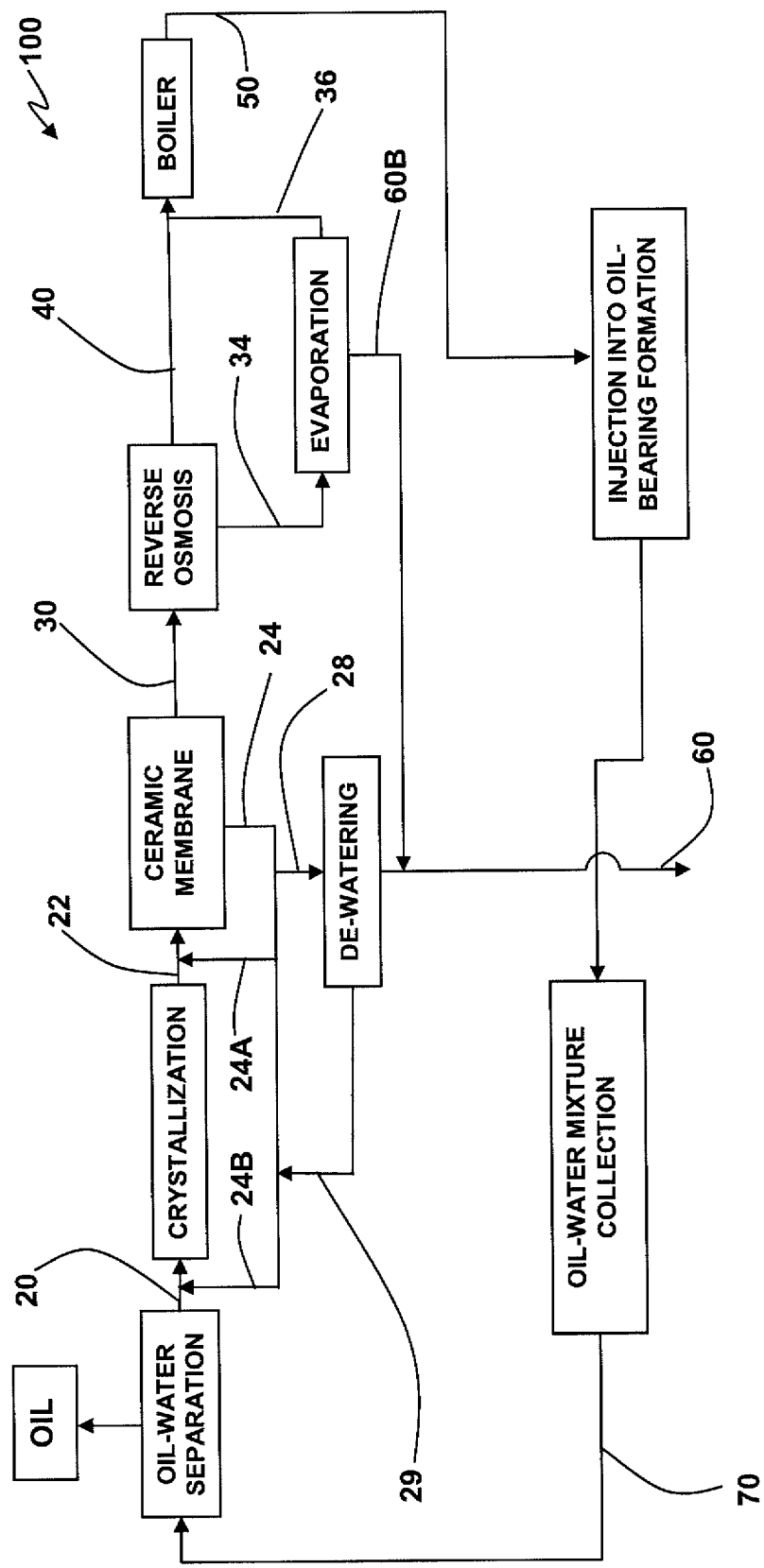
FIG. 3 is a schematic representation of an oil recovery process utilizing reverse osmosis and evaporation with a ceramic membrane process to generate boiler feedwater.
Figure 4:
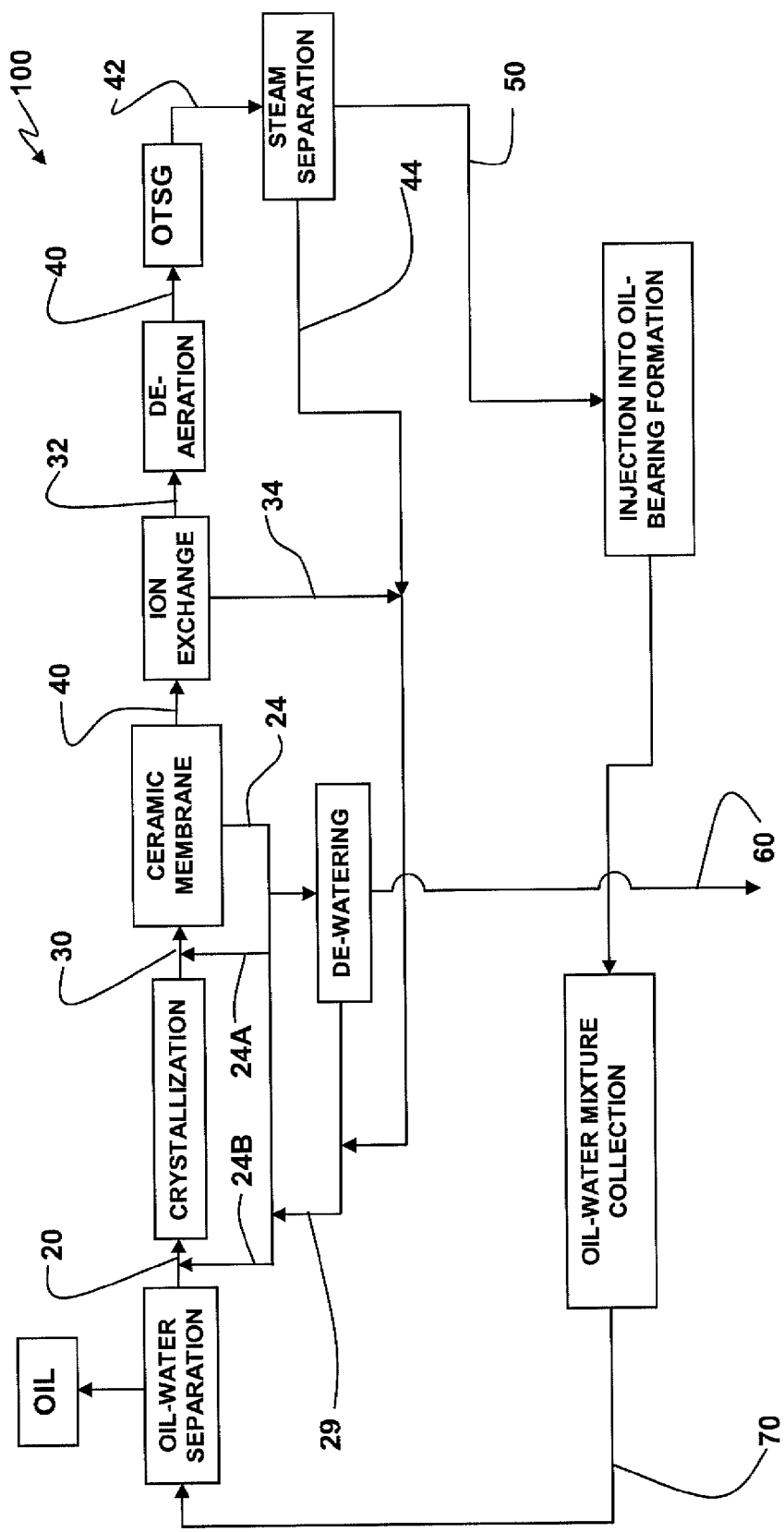
FIG. 4 is a schematic representation of an oil recovery process utilizing ion exchange separation with a ceramic membrane process to generate OTSG feedwater.

FIGS. 2-4 illustrate various heavy oil recovery processes that utilize ceramic membranes to remove pollutants such as silica and oil from the produced water. In the various processes illustrated, the produced water is subjected to a crystallization process, prior to reaching the ceramic membranes, for converting soluble silica to insoluble silica. Generally, the produced water is dosed with a crystal forming compound such as magnesium oxide. The crystal forming compound forms crystals in the produced water that adsorb silica, resulting in silica being driven or pulled out of solution and adsorbed on the formed crystals. Various crystal forming materials can be added. In some cases magnesium may be added in the form of magnesium oxide or magnesium chloride. In any event, the magnesium compound forms magnesium hydroxide crystals that function to sorb silica in the produced water, resulting in the conversion of silica from soluble to insoluble form. It should be noted that in the case of magnesium that there is an insufficient concentration of magnesium typically found in produced water to yield a substantial amount of magnesium hydroxide crystals. Thus, in the case of using magnesium for crystal formation, the process generally requires the addition of magnesium to the produced water. Other reagents or compounds may also be mixed with the produced water to remove silica through precipitation or adsorption. For example, ferric chloride, aluminum oxide, aluminum sulphate, calcium oxide or alum may be mixed with the produced water. In some cases the dissolved silica and the produced water can be removed from solution by mixing compounds with the produced water where the compounds have surface active properties. The surface active properties may draw silica out of solution. Examples of such compounds are oxides of aluminum, silica and titanium.

The pH of the produced water should be maintained in the range of 9.5 to 11.2, and preferably between 10.0 and 10.8 for optimum precipitation of silica. Some caustic in the form of sodium hydroxide or sodium carbonate may be added to trim the pH to a proper value. The duration of the crystallization process only needs to be for a time period sufficient to prevent scaling of the downstream ceramic membrane or membranes. Duration does not have to be so long as to promote the growth of large silica crystals.

Effectively, the crystallization process generates a suspension of crystals in the produced water. In the case of magnesium hydroxide crystals, these crystals adsorb and pull silica out of solution, effectively precipitating the silica. The produced water with the precipitated silica crystals, along with any insoluble silica that was present in the raw produced water, is directed to the ceramic membrane. The ceramic membrane produces a reject stream having the insoluble silica therein. Permeate produced by the ceramic membrane is directed downstream for further purification or to a steam generation process. A portion of the ceramic membrane's reject stream can be recirculated to the ceramic membrane. Typically, about 1-10% of the water in the feed stream will pass through the ceramic membrane as permeate. A relatively high recirculation rate will maintain a relatively high cross flow velocity across the ceramic membrane, which will inhibit fouling. Recirculation of the reject stream is continued until the concentration of the suspended solids in the reject stream reach approximately 1% to 3% by weight. Once this level of solids concentration in the reject stream is reached, then a selected flow of the reject stream can be bled off and directed to a dewatering process for example. Water from the dewatering process can be directed back and mixed with the produced water for continued treatment.

It is believed that the permeate from the ceramic membrane will typically have a silica concentration in the range of 10-50 ppm and a pH of 9.5 to 11.2.

Turning now to a particular embodiment of the present invention, and referring to FIG. 2, it is appreciated that the purification process includes an evaporation process to which ceramic membrane permeate is directed for further treatment. The evaporation process may be accomplished utilizing any of a variety of evaporators, including, but not limited to, falling film, forced circulation, multiple effects, and mechanical vapor recompression. The evaporation process generates a distillate stream 40 and a waste stream 60B. Depending on the evaporation process utilized, a concentrated brine recirculation loop (not shown) may be incorporated with the evaporator. Distillate water stream 40 is directed to a boiler to produce steam stream 50 for injection into the oil-bearing formation.

Prior to the produced water reaching the evaporation process, the produced water is subjected to the crystallization process described above, and to treatment by a ceramic membrane or membranes generally interposed between the crystallization process and the evaporation process. Note in the FIG. 2 process where the ceramic membrane produces a reject stream 24 that is recycled for further treatment by the ceramic membrane. Reject stream 24 is split into segments 24A and 24B. Note that segment 24A returns the reject to the ceramic membrane. That is, segment 24A returns the reject to the ceramic membrane or to a point upstream of the ceramic membrane and downstream from the crystallization zone. Segment 24B returns reject to the crystallization zone. The return can be directly to the crystallization zone or to a point upstream of the crystallization zone and preferably downstream form the oil-water separation unit. Once the solids concentration in the reject stream 24 has reached a selected level, portions of the reject stream are directed into a waste stream 28 which leads to a dewatering process. The dewatering process produces a concentrated waste stream 60 and a less concentrated stream 29 that is recycled to a point in the process upstream from the crystallization process. As described above, the crystallization process, in combination with the ceramic membrane or membranes, effectively removes soluble and insoluble silica, and in some cases residual oil, from the produced water prior to the produced water reaching the evaporation process. This will generally inhibit fouling of the heat transfer surfaces of evaporators used in the evaporation process.

FIG. 3 illustrates another embodiment of the heavy oil recovery process. This process is similar to the process depicted in FIG. 2 with the exception that the evaporation process shown in FIG. 2 is replaced by a reverse osmosis process that is interposed between the ceramic membrane and boiler, and an evaporation process that is interposed between the reverse osmosis process and the boiler. In the FIG. 3 process, the permeate stream 30 from the ceramic membrane is directed to a reverse osmosis process. Here the reverse osmosis process produces a permeate stream 40 that is directed to the boiler, and also produces a reject stream 34. The reject stream 34 from the reverse osmosis process is directed into an evaporator which produces a distillate stream 36. Distillate from the distillate stream 36 is directed into the boiler. The evaporation process produces a blowdown or waste stream 60B that is directed to the waste stream 60

Again, the basic processes discussed above with respect to crystallization and the ceramic membrane or membranes take place in the process of FIG. 3. Simply put, the crystallization process in combination with the ceramic membrane or membranes removes substantial soluble and insoluble silica, and in some cases residual oil, in the produced water prior to the produced water reaching the reverse osmosis process or the evaporation process.

Another embodiment, as illustrated in FIG. 4, includes ion exchange treatment as a part of the purification process. Ceramic membrane permeate 40 is directed to an ion exchange process to produce an ion exchange effluent 32 and an ion exchange reject stream 34. Ion exchange effluent 32 is subjected to a de-aeration process to remove dissolved gases. Ion exchange reject stream 34 is directed back to produced water stream 20. The de-aerated ion exchange effluent forms a purified water stream 40 that is directed to a once through steam generator (OTSG) to produce a steam-water mixture stream 42. Steam-water mixture stream 42 is directed to a steam separation process where liquid is separated from steam, producing a liquid stream 44 and a steam stream 50. Liquid stream 44 is directed back to the produced water stream 20 while the steam stream 50 is injected into the oil-bearing formation.

Figure 5:
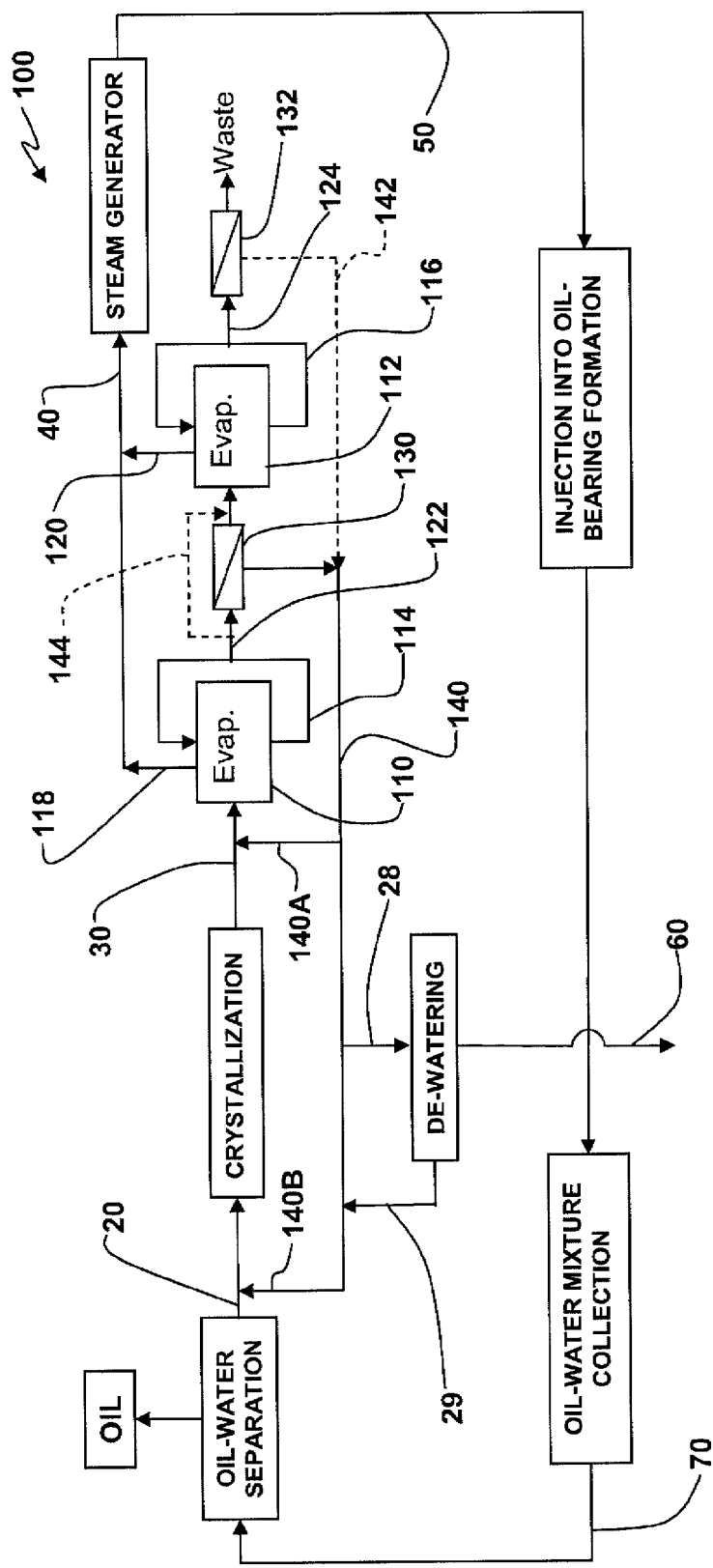
FIG. 5 is a schematic illustration of an oil recovery process utilizing at least two evaporators in series downstream from a ceramic membrane.

FIG. 5 illustrate an alternative process for purifying produced water in a heavy oil recovery process. In the case of the FIG. 5 process, there is provided two evaporators 110, 112 generally interposed between the crystallization step and boiler or steam generator. Each evaporator 110, 112 includes a brine recirculation line 114, 116. Further the evaporators 110, 112 include distillate outlet lines 118, 120. It is appreciated that each evaporator 110, 112 produces steam which is condensed to form distillate which in turn is directed from the evaporators 110, 112 via outlet lines 118 and 120. Distillate outlet lines 118 and 120 are communicatively connected to a steam generator feed line 40 which in turn directs the distillate produced by the evaporators 110, 112 to the steam generator.

The process illustrated in FIG. 5 includes two ceramic membranes 130, 132. Ceramic membrane 130 is interposed between the evaporators 110 and 112 while membrane 132 is disposed downstream from evaporator 112. A brine feed line 122 extends from brine circulation line 114 to ceramic membrane 130. Brine feed line 124 extends from brine circulation line 116 to ceramic membrane 132. A return line 140 directs a reject stream from one or both of the ceramic membrane 130,132 to a point upstream of evaporator 110. As seen in FIG. 5, a portion of the concentrated brine being recirculated in lines 114 and 116 is directed to membranes 130 and 132. Membranes 130 and 132 each produce a reject stream and a permeate stream. The permeate stream of ceramic membrane 130 is directed to evaporator 112 while the permeate stream of ceramic membrane 132 is wasted or directed to other points in the process for further purification. Reject line 140 is split into segments 140A and 140B. Segment 140A returns the reject upstream to the evaporator 110. That is, segment 140A returns the reject to the evaporator 110 or to a point upstream of the evaporator and downstream from the crystallization zone. Segment 140B returns reject to the crystallization zone. The return can be directly to the crystallization zone or to a point upstream of the crystallization zone and preferably downstream form the oil-water separation unit. Once the solids concentration in the reject stream 140 has reached a selected level, portions of the reject stream are directed into a waste stream 28 which leads to a dewatering process. The dewatering process produces a concentrated waste stream 60 and a less concentrated stream 29 that is recycled to a point in the process upstream from the crystallization process. The reject stream from ceramic membrane 132 can be returned or recycled via line 142 to line 140.

Figure 6:
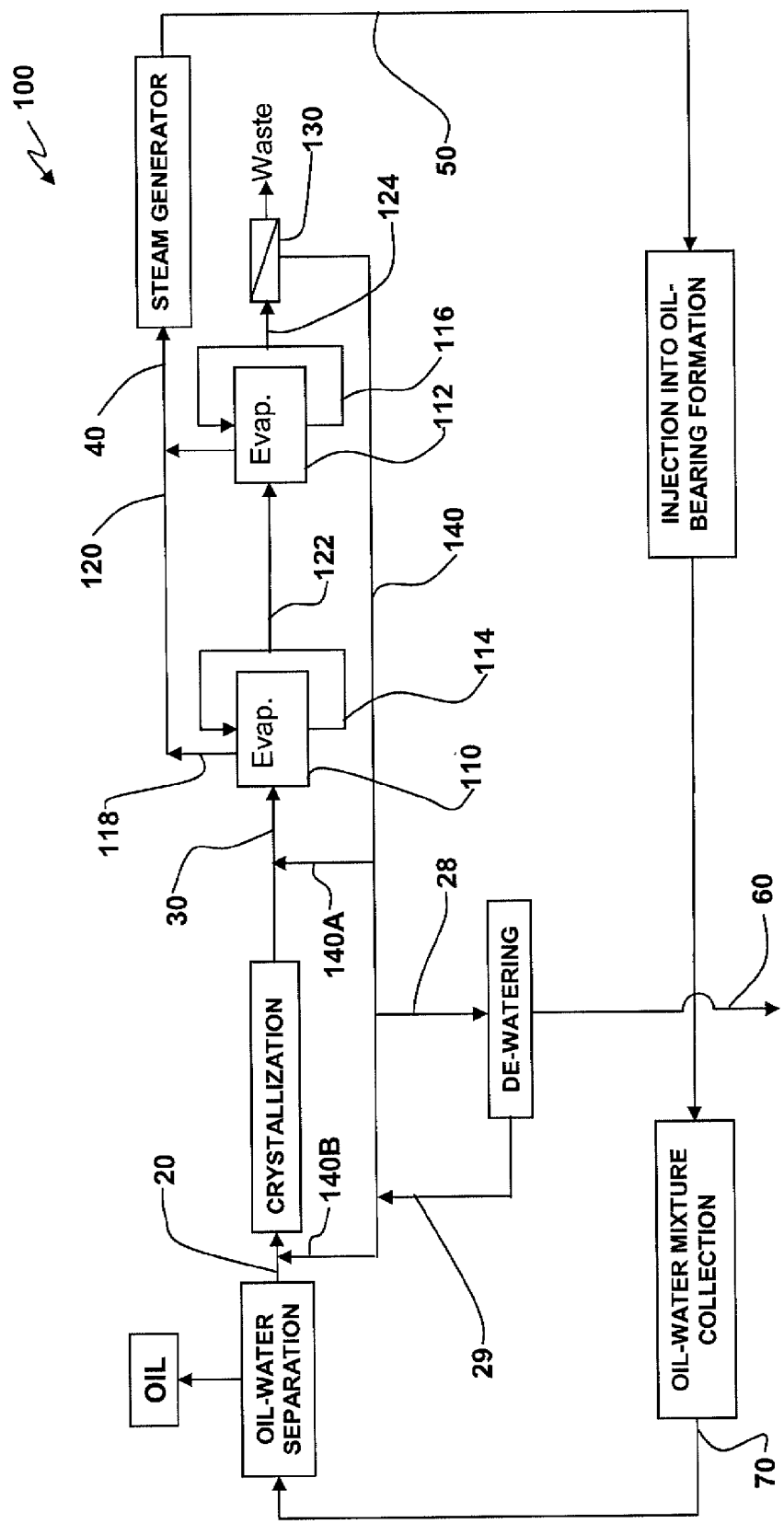
FIG. 6 is a schematic illustration similar to FIG. 5 but illustrating an alternative process or method.

FIG. 6 illustrates a process that is similar to that discussed above and shown in FIG. 5. However, in the FIG. 6 embodiment, there is provided only one ceramic membrane 130 and it is provided downstream from the two evaporators 110, 112. In this case, the reject stream from the ceramic membrane 130 is recycled via line 140 to the evaporator 110 or to a point upstream of the evaporator 110. In addition, some of the reject stream can be recycled to the crystallization zone or to a point upstream of the crystallization zone via line 140B.

Figure 7:
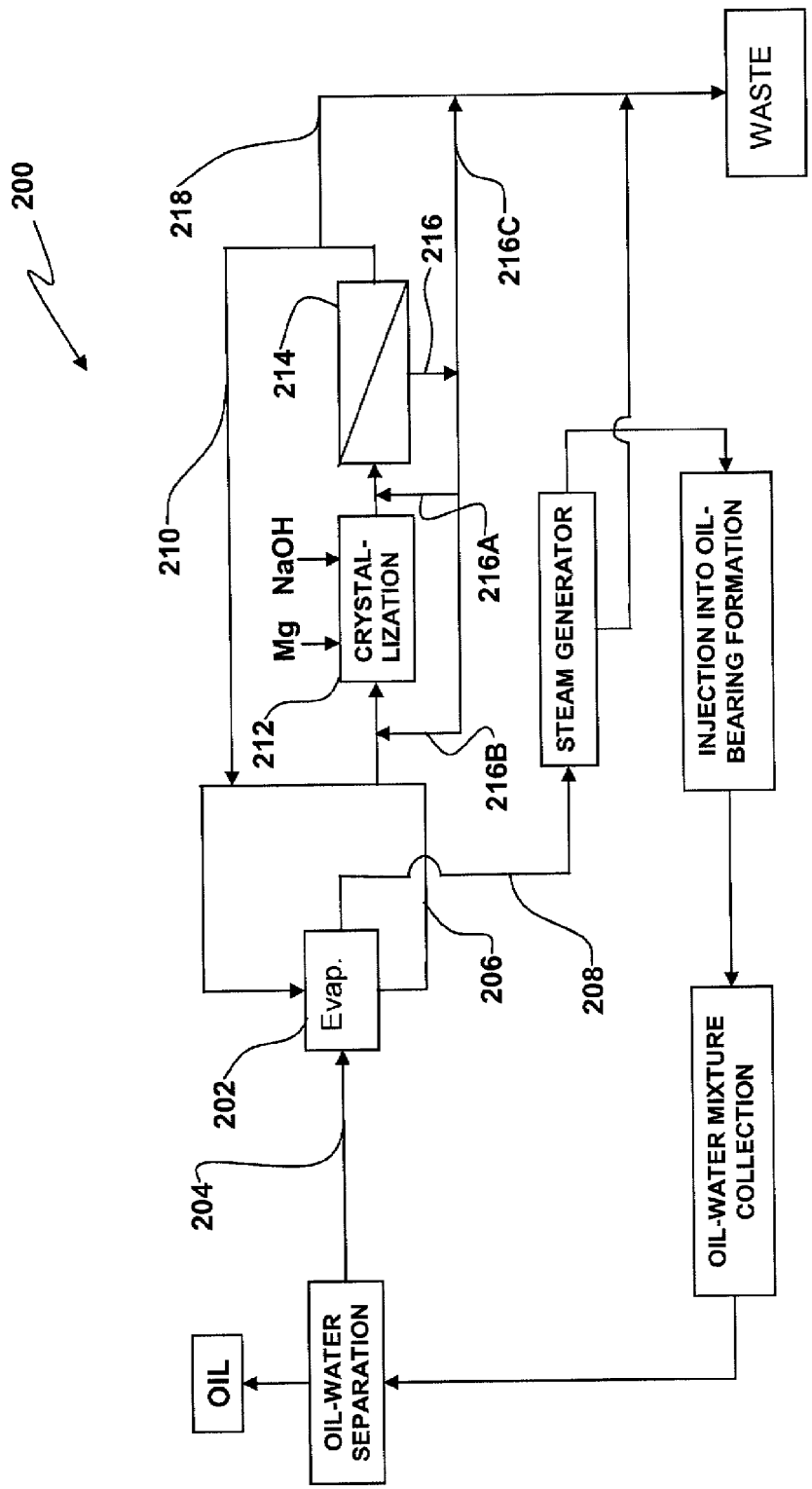
FIG. 7 is a schematic illustration of an oil recovery process utilizing a crystallization process and a ceramic membrane to filter concentrated brine produced by an evaporator.

FIG. 7 is an alternative process 200 for removing silica, oil and other dissolved and suspended solids in an oil recovery process. In this exemplary process, an evaporator 202 receives an evaporator feed via line 204. Line 204 directs produced water from the oil-water separators including conventional de-oiling, to the evaporator 202. Evaporator 202 produces steam and a concentrated brine. The concentrated brine is recirculated via line 206 through the evaporator. Evaporator 202 produces steam which is condensed to form the distillate referred to above and the distillate is directed through line 208 to a steam generator where steam is produced for injection into an oil bearing formation. To remove dissolved silica, residual oil and other contaminants, at least a portion of the brine circulating in the brine recirculation line 206 is treated. In this case there is provided brine treatment line 210 that is communicatively connected to the brine recirculation line 206. In the brine treatment line 210 there is provided a crystallization reactor 212 and a ceramic membrane 214 disposed downstream of the crystallization reactor. A certain amount of the brine circulating in line 206 is bled-off and directed into brine treatment line 210. There the brine is subjected to a precipitation or crystallization process in reactor 212. In one example, a crystallizing reagent such as magnesium oxide or magnesium chloride is added to the brine and mixed with the brine by a mixer disposed in the crystallization reactor. Also, the pH can be adjusted here by the addition of a caustic such a sodium hydroxide. In any event, the magnesium oxide or magnesium chloride when mixed with the brine will form magnesium hydroxide. Magnesium hydroxide and silica co-precipitate in the crystallization reactor 212. The concentrated brine having the precipitated silica is then directed to the downstream ceramic membrane 214. There the ceramic membrane 214 produces a permeate stream that is directed downstream from the ceramic membrane 214 through line 210 and returned to the concentrated brine where it is mixed or joins the concentrated brine for further recirculation through the evaporator 202. The ceramic membrane 214 also produces a reject stream that is directed into reject line 216. The reject stream can be wasted, returned to the ceramic membrane 214, or returned to the crystallization reactor 212. In some cases it may be desirable to increase the concentration of suspended solids in the brine that reaches the crystallization reactor 212. This can be accomplished by selectively controlling the amount of reject pumped to line 216(B). In some cases it may be desirable to maintain the concentration of suspended solids in the concentrated brine that enters the crystallization reactor 212 at a concentration of 10,000 mg/l and higher. In other cases it may be desirable to maintain the suspended solid-concentration even higher, on the order of 20,000 to 30,000 mg/l. Furthermore, since the reject stream leading from the ceramic membrane 214 includes multiple segments 216(A), 216(B) and 216(C), it follows that a portion of the reject can also be returned to the ceramic membrane 214 or wasted through line 216(C). It also may be desirable to waste a portion of the concentrated brine that forms a part of the permeate stream produced by the ceramic membrane 214. This is accomplished by line 218 that leads from brine treatment line 210 to a waste line.

The present invention utilizes a ceramic membrane to substantially remove silica from produced water as part of a water cleaning and purification process that produces steam for injection into oil-bearing formations. In the embodiments described, a ceramic membrane is utilized upstream of other water purification processes. It is appreciated, however, that a ceramic membrane process may be utilized elsewhere in such overall processes for removal of oil and other undesirable contaminants from the water.

In the above description, reference is made to both a boiler and an OSTG. It is appreciated that various systems and processes can be utilized for generating steam for injection into the oil bearing formation. For example, reference is made to provisional patent application No. 60/890,889 filed Feb. 21, 2007, the contents of which are expressly incorporated herein by reference.

Details of the ceramic membrane are not dealt with herein because such is not per se material to the present invention, and further, ceramic membranes are known in the art. For a review of general ceramic membrane technology, one is referred to the disclosures found in U.S. Pat. Nos. 6,165,553 and 5,611,931, the contents of which are expressly incorporated herein by reference. These ceramic membranes, useful in the processes disclosed herein, can be of various types. In some cases the ceramic membrane may be of the type that produces both a permeate stream and a reject stream. On the other hand, the ceramic membranes may be of the dead head type, which only produces a permeate stream and from time-to-time the retentate is backflushed or otherwise removed from the membrane.

The structure and materials of the ceramic membranes as well as the flow characteristics of ceramic membranes varies. When ceramic membranes are used to purify produced water, the ceramic membranes are designed to withstand relatively high temperatures as it is not uncommon for the produced water being filtered by the ceramic membranes to have a temperature of approximately 90° C. or higher.

Ceramic membranes normally have an asymmetrical structure composed of at least two, mostly three, different porosity levels. Indeed, before applying the active, microporous top layer, an intermediate layer with a pore size between that of the support, and a microfiltration separation layer. The macroporous support ensures the mechanical resistance of the filter.

Ceramic membranes are often formed into an asymmetric, multi-channel element. These elements are grouped together in housings, and these membrane modules can withstand high temperatures, extreme acidity or alkalinity and high operating pressures, making them suitable for many applications where polymeric and other inorganic membranes cannot be used. Several membrane pore sizes are available to suit specific filtration needs covering the microfiltration, the ultrafiltration, and nanofiltration ranges from 1 micron down to 250 Dalton MWCO).

Ceramic membranes today run the gamut of materials (from alpha alumina to zircon). The most common membranes are made of Al, Si, Ti or Zr oxides, with Ti and Zr oxides being more stable than Al or Si oxides. In some less frequent cases, Sn or Hf are used as base elements. Each oxide has a different surface charge in solution. Other membranes can be composed of mixed oxides of two of the previous elements, or are established by some additional compounds present in minor concentration. Low fouling polymeric coatings for ceramic membranes are also available.

Ceramic membranes are typically operated in the cross flow filtration mode. This mode has the benefit of maintaining a high filtration rate for membrane filters compared with the direct flow filtration mode of conventional filters. Cross flow filtration is a continuous process in which the feed stream flows parallel (tangential) to the membrane filtration surface and generates two outgoing streams.

A small fraction of feed called permeate or filtrate, separates out as purified liquid passing through the membrane. The remaining fraction of feed, called retentate or concentrate contains particles rejected by the membrane.

The separation is driven by the pressure difference across the membrane, or the trans-membrane pressure. The parallel flow of the feed stream, combined with the boundary layer turbulence created by the cross flow velocity, continually sweeps away particles and other material that would otherwise build up on the membrane surface.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method of recovering oil from an oil well comprising:
   a. recovering an oil/water mixture from the well;
   b. separating oil from the oil/water mixture to produce an oil product and produced water having dissolved silica therein;
   c. mixing a crystallizing reagent with the produced water to form crystals in the produced water and precipitating the dissolved silica;
   d. directing the produced water with the precipitated silica to a membrane;
   e. filtering the produced water with the membrane and producing a permeate stream;
   f. directing the permeate stream to a steam generator and producing steam;
   g. injecting the steam into an injection well, giving rise to the formation of the oil/water mixture; and
   h. wherein filtering the produced water with the membrane produces a reject stream concentrated with the precipitated silica and wherein the method includes mixing at least a portion of the reject stream from the membrane with the produced water upstream of the membrane.

2. The method of claim 1 including prior to directing the permeate stream from the membrane to the steam generator, treating the permeate stream in an ion exchange unit.

3. The method of claim 1 including prior to directing the permeate stream from the membrane to the steam generator, treating the permeate stream in a reverse osmosis unit.

4. The method of claim 1 including prior to directing the permeate stream from the membrane to the steam generator, further treating the permeate stream from the membrane with an evaporator and producing a distillate that is directed to the steam generator.

5. The method of claim 1 including mixing at least a portion of the reject stream with the produced water at a point upstream of the membrane to increase the concentration of suspended solids in the produced water and mixing the crystallizing reagent with the produced water having the increased concentration of suspended solids.

6. The method of claim 1 including maintaining the concentration of suspended solids in the produced water upstream of the membrane at a concentration of at least 10,000 mg/l.

7. The method of claim 1 wherein the membrane produces a reject stream concentrated with the precipitated silica and the method includes mixing sufficient quantities of the reject stream with the produced water at a point upstream of the membrane in order to maintain the concentration of suspended solids within the produced water at a point upstream of the membrane at a concentration of at least 10,000 mg/l.

8. The method of claim 1 including mixing magnesium oxide or magnesium chloride with the produced water and forming magnesium hydroxide, and co-precipitating the magnesium hydroxide and silica from the produced water prior to the produced water being filtered by the membrane.

9. The method of claim 8 including maintaining the pH of the produced water at approximately 9.8 to approximately 10.8.

10. The method of claim 9 including raising the pH of the produced water by adding a caustic to the produced water.

11. The method of claim 1 wherein the membrane produces a reject stream concentrated with the precipitated silica and the method includes:
   a. mixing magnesium oxide or magnesium chloride with the produced water and forming magnesium hydroxide, and co-precipitating the magnesium hydroxide and silica from the produced water prior to the produced water being filtered by the membrane;
   b. maintaining the pH of the produced water at approximately 9.8 to approximately 10.8; and
   c. mixing sufficient quantities of the reject stream with the produced water at a point upstream of the membrane in order to maintain the concentration of suspended solids in the produced water at a point upstream of the membrane at a concentration of at least 10,000 mg/l.

12. The method of claim 1 including maintaining the silica concentration of the permeate stream at a concentration of less than 50 ppm.

13. The method of claim 1 including removing at least 85% of the silica in the produced water by filtering the produced water with the membrane.

14. The method of claim 1 including mixing the crystallizing agent with the produced water in a crystallization zone located upstream from the membrane, and recycling at least a portion of a reject stream from the membrane including recycling a first portion of the reject stream to a point between the crystallization zone and the membrane and recycling a second portion of the reject stream to the crystallization zone.

15. A method of recovering oil from an oil well comprising:
   a. recovering an oil/water mixture from the well;
   b. separating oil from the oil/water mixture to produce an oil product and produced water having dissolved silica therein;
   c. directing the produced water to a crystallization zone;
   d. mixing a crystallizing agent with the produced water in the crystallization zone to form crystals in the produced water and precipitating the dissolved silica;
   e. directing the produced water with the precipitated silica to a membrane located downstream from the crystallization zone;
   f. filtering the produced water with the membrane and producing a permeate stream and a reject stream concentrated with the precipitated silica;
   g. splitting the reject stream into at least two streams, a first reject stream and a second reject stream;
   h. recycling the first reject stream to the membrane;
   i. recycling the second reject stream to the crystallization zone;
   j. directing the permeate stream to a steam generator and producing steam; and
   k. injecting the steam into an injection well, giving rise to the formation of the oil/water mixture.

16. The method of claim 15 and wherein the produced water includes suspended solids and wherein the method includes maintaining the concentration of suspended solids in the crystallization zone at approximately 10,000 mg/l and higher.

17. The method of claim 15 wherein the produced water includes suspended solids and wherein the method includes controlling the concentration of suspended solids in the crystallization zone by controlling the flow of the second reject stream to the crystallization zone.

18. The method of claim 15 including varying the flow of the second reject stream so as to maintain the concentration of suspended solids in the crystallization zone at approximately 10,000 mg/l or higher.

19. A method of recovering oil from an oil well comprising:
   a. recovering an oil/water mixture from the well;
   b. separating oil from the oil/water mixture to produce an oil product and produce water having dissolved silica therein;
   c. directing the produced water to an evaporator and producing steam and a concentrated brine having dissolved silica therein;
   d. mixing a reagent or compound with the brine and causing the silica to be removed from solution;
   e. directing the brine with the silica out of solution to a membrane and filtering the brine to produce a reject stream and a permeate stream;
   f. mixing at least a portion of the permeate stream with the brine having the dissolved silica;
   g. recycling or wasting at least a portion of the reject stream;
   h. condensing the steam to form a distillate;
   i. directing the distillate to a steam generator and heating the distillate in the steam generator to produce steam; and
   j. injecting the steam into an injection well.

20. A method of recovering oil from an oil well comprising:
   a. recovering an oil/water mixture from the well;
   b. separating oil from the oil/water mixture to produce an oil product and produced water having dissolved silica therein;
   c. mixing a crystallizing reagent with the produced water to form crystals in the produced water and precipitating the dissolved silica;
   d. directing the produced water with the precipitated silica to a membrane;
   e. filtering the produced water with the membrane and producing a permeate stream;
   f. treating the permeate stream in an ion exchange unit;
   g. after treating the permeate stream in the ion exchange unit, directing the permeate stream to a steam generator and producing steam; and
   h. Injecting the steam into an injection well, giving rise to the formation of the oil/water mixture.

21. A method of recovering oil from an oil well comprising:
   a. recovering an oil/water mixture from the well;
   b. separating oil from the oil/water mixture to produce an oil product and produced water having dissolved silica therein;
   c. mixing a crystallizing reagent with the produced water to form crystals in the produced water and precipitating the dissolved silica;
   d. directing the produced water with the precipitated silica to a membrane;
   e. filtering the produced water with the membrane and producing a permeate stream;
   f. treating the permeate stream in a reverse osmosis unit;
   g. after treating the permeate stream in the reverse osmosis unit, directing the permeate stream to a steam generator and producing steam; and
   h. injecting the steam into an injection well, giving rise to the formation of the oil/water mixture.

22. A method of recovering oil from an oil well comprising:
   a. recovering an oil/water mixture from the well;

b. separating oil from the oil/water mixture to produce an oil product and produced water having dissolved silica therein;
c. mixing a crystallizing reagent with the produced water to form crystals in the produced water and precipitating the dissolved silica;
d. directing the produced water with the precipitated silica to a membrane;
e. filtering the produced water with the membrane and producing a permeate stream;
f. treating the permeate stream in an evaporator and producing a distillate;
g. directing the distillate to a steam generator and producing steam; and
h. injecting the steam into an injection well, and giving rise to the formation of the oil/water mixture.

23. A method of recovering oil from an oil well comprising:
a. recovering an oil/water mixture from the well;
b. separating oil from the oil/water mixture to produce an oil product and produced water having dissolved silica therein;
c. mixing a crystallizing reagent with the produced water to form crystals in the produced water and precipitating the dissolved silica;
d. directing the produced water with the precipitated silica to a membrane;
e. filtering the produced water with the membrane and producing a permeate stream;
f. directing the permeate stream to a steam generator and producing steam;
g. injecting the steam into an injection well, giving rise to the formation of the oil/water mixture;
h. mixing magnesium oxide or magnesium chloride with the produced water and forming magnesium hydroxide, and co-precipitating the magnesium hydroxide and silica from the produced water prior to the produced water being filtered by the membrane; and
i. Maintaining the pH of the produced water at approximately 9.8 to approximately 10.8.

24. A method of recovering oil from an oil well comprising:
a. recovering an oil/water mixture from the well;
b. separating oil from the oil/water mixture to produce an oil product and produced water having dissolved silica therein;
c. mixing a crystallizing reagent with the produced water to form crystals in the produced water and precipitating the dissolved silica;
d. directing the produced water with the precipitated silica to a membrane;
e. filtering the produced water with the membrane and producing a permeate stream;
f. directing the permeate stream to a steam generator and producing steam;
g. injecting the steam into an injection well, giving rise to the formation of the oil/water mixture; and
h. maintaining the silica concentration of the permeate stream at a concentration of less than 50 ppm.

25. A method of recovering oil from an oil well comprising:
a. recovering an oil/water mixture from the well;
b. separating oil from the oil/water mixture to produce an oil product and produced water having dissolved silica therein;
c. mixing a crystallizing reagent with the produced water to form crystals in the produced water and precipitating the dissolved silica;
d. directing the produced water with the precipitated silica to a membrane;
e. filtering the produced water with the membrane and producing a permeate stream;
f. directing the permeate stream to a steam generator and producing steam;
g. injecting the steam into an injection well, giving rise to the formation of the oil/water mixture; and
h. removing at least 85% of the silica in the produced water by filtering the produced water with the membrane.

* * * * *